Patented Nov. 8, 1932

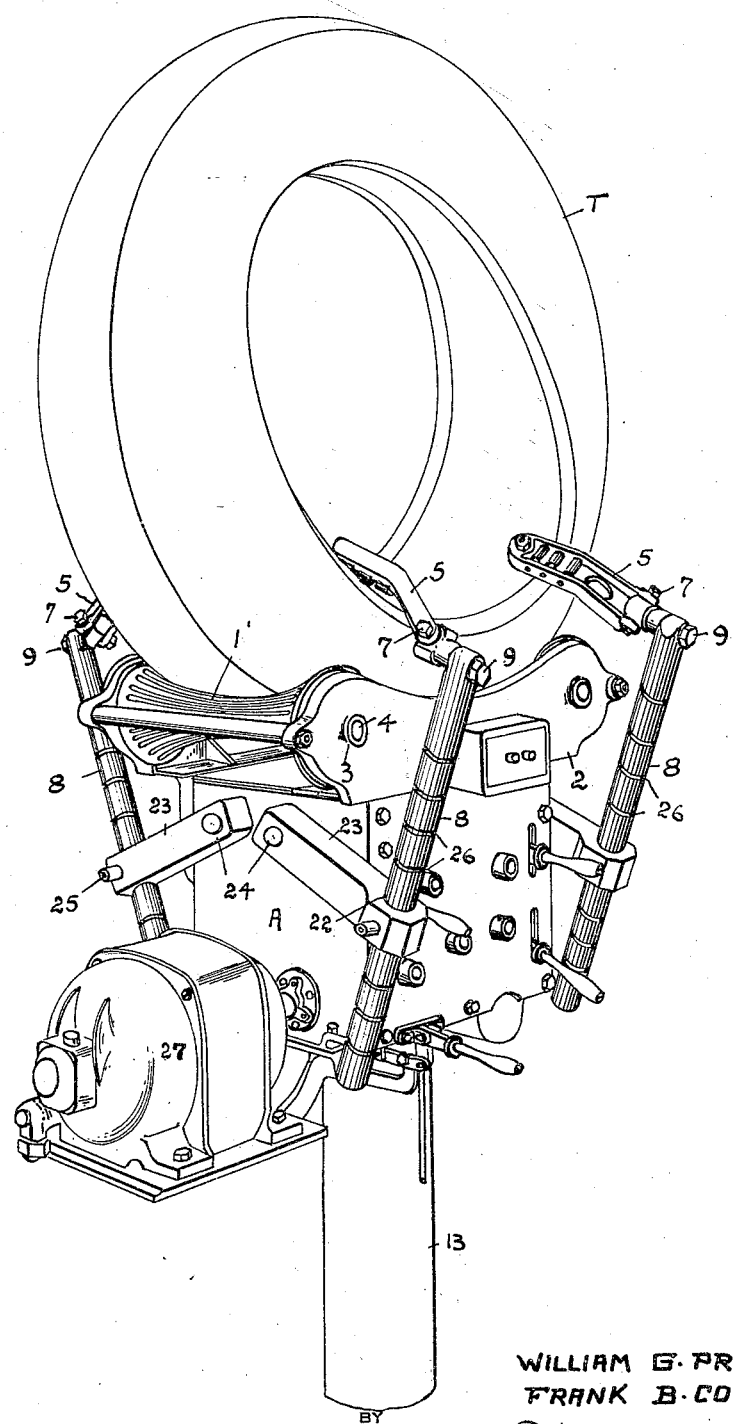

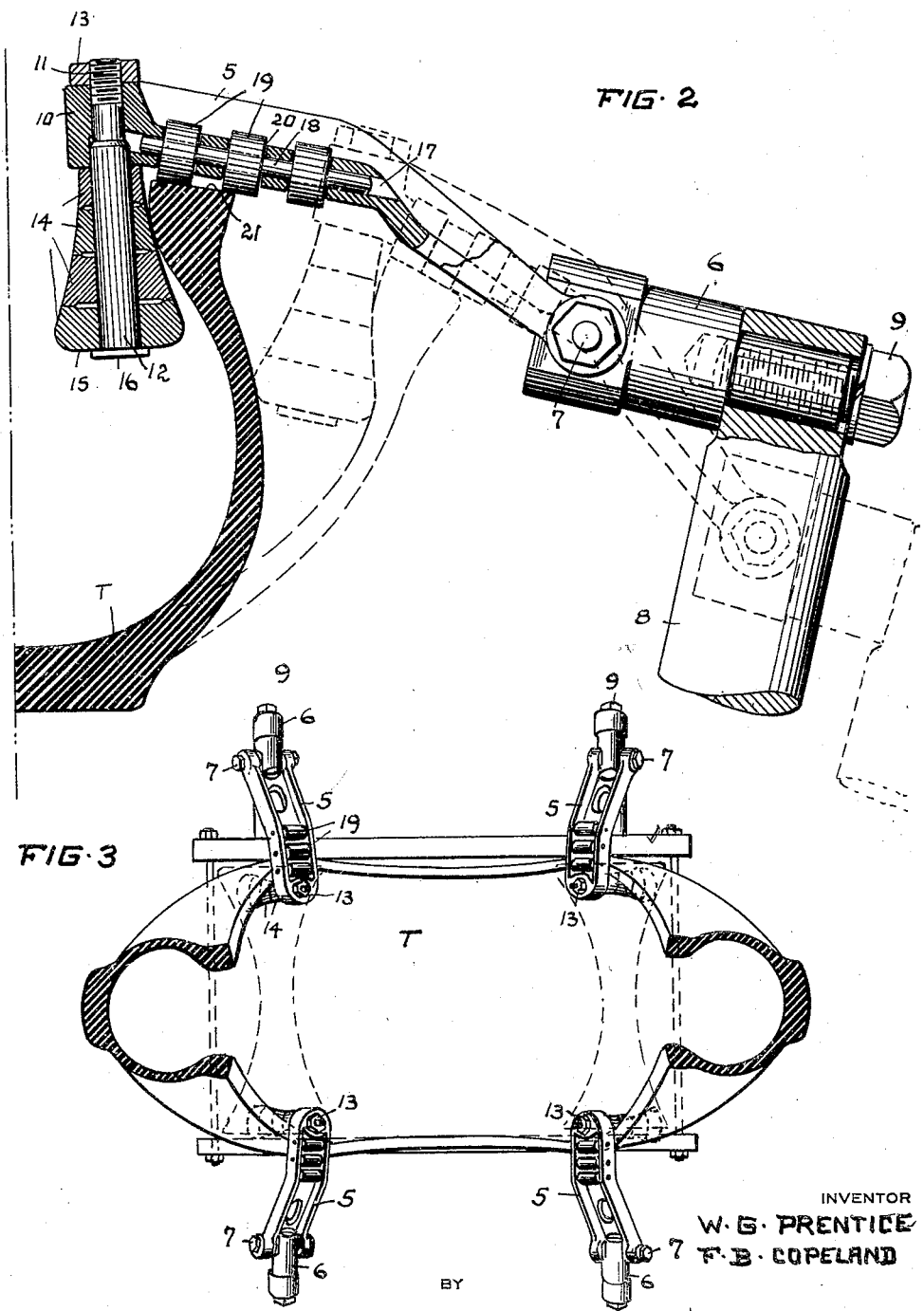

1,886,834

UNITED STATES PATENT OFFICE

WILLIAM G. PRENTICE, OF INDIANAPOLIS, INDIANA, AND FRANK B. COPELAND, OF ASHLAND, OHIO, ASSIGNORS TO THE ELITE MANUFACTURING COMPANY, OF ASHLAND, OHIO, A CORPORATION OF OHIO

TIRE SPREADING MACHINE

Application filed June 19, 1931. Serial No. 545,450.

Our invention relates to tire machines and is an improvement over the machine disclosed in our co-pending application, Serial No. 411,938, filed November 5, 1929. The present invention has for its general object the provision of a motor driven machine adapted for spreading or opening a tire casing for inspection and repair, with minimum friction between the spreading means and the tire. A further object of the invention is to provide spreading means which can be readily adjusted to accommodate tires of different diameter and cross section, all as hereinafter more fully described and pointed out in the appended claims.

In the accompanying drawings, Figure 1 is a perspective view of the tire spreading machine showing the improvements according to the invention, and Fig. 2 is a sectional view through roller and the attachment bracket for the roller as applied to a tire showing in dotted lines the position of the rollers and the bracket after spreading the tire. Fig. 3 is a sectional view through the tire while spread in the machine showing the angular relationship of the brackets and rollers.

Referring more particularly to the drawings, the machine comprises a frame A suitably mounted upon a pedestal B. A pair of elongated spool-shaped rollers 1'—1' are rotatably supported in an elevated position upon the open top portion 2 of the frame, which is formed with journals 3 in which the shaft 4 of the rollers are journaled. The rollers are flanged or flared at their opposite ends and formed with reduced roughened cylindrical portions adapted to centrally seat the head portion of a split casing or tire T, thus providing an efficient frictional driving means for revolving the tire when the latter is pressed to its seat on the rollers and both rollers are caused to revolve in the same direction.

The tire is pressed and held upright upon the driving rollers, and the tread portion of the tire T also caused to flatten itself in some degree upon the cylindrical portions of the rollers, by spreading and holding the divided base portions open and apart. The spreading devices include two pair of brackets 5, one pair for each side of the tire, and arranged to swing in pairs, in opposing directions, directly above each driving roller and either substantially parallel therewith or inclined on converging lines in respect thereto. The bifurcated inner end of each bracket 5 is hinged to the inner end of a short arm 6 by a headed bolt 7, the outer end of each short arm being adjustably secured to the upper end of a supporting or actuating rod 8, by means of set screws 9. It will of course be understood that the short arms 6 and rods 8 are arranged in pairs, as in the case of the brackets.

The brackets 5 are formed with enlargements 10 angularly related or slightly offset in a downward direction with respect to the main body of the bracket and each having a bore 11 extending therethrough from top to bottom thereof, for receiving the upper end of a depending shaft 12. Nuts 13 having screw engagement with the threaded upper ends of these shafts lock the latter tightly to the brackets. The shafts 12 provide bearing for a series of rollers 14, each succeeding roller of a series being of larger size than the roller next above, and so shaped to form when assembled upon the shaft a cone-shaped rolling and pulling member 15, conforming to and adapted for engagement with the internal wall of the tire, during spreading operations. The rollers 14 are loosely supported on the shafts 12 in superposed position by the heads 16 of the shafts, and consequently are free to rotate independently of each other when frictionally engaged with the tire. Due to the great pressure which must be exerted on the tire by the rolling and pulling members 15 in spreading the sides of the casing apart while the tire is being rotated, the frictional resistance between the contacting parts is very great, and often injurious to the tire. By forming the members 15 of a plurality of rollers, radially disposed with respect to the axis of the tire, it will be noted that the rollers 14 will be engaged by the tire successively from the topmost to the bottom-most. Frictional resistance progressively increases in the same ratio that the part of member 15 which is in contact with the tire is spaced radially from the axis of rotation of the tire, and it is desirable that this contact be made progressively from one rotating member to another, rather than over the surface of a single rotatable member.

The main body of each bracket 5 is formed with a longitudinal bore 17 for receiving a shaft 18 on which a plurality of rollers 19 are rotatably mounted. These rollers protrude through slots 20 in position to support the brackets upon and in anti-frictional engagement with the upper face or periphery 21 of the tire T, while the tire is being rotated during the spreading operations.

Each rod 8 is adjustably mounted in an opening 22 formed in the outer eind of an oscillatory lever or arm 23, the inner end of which is fixed to a rock shaft 24 extending through and projecting at opposite ends from the frame or casing A. The levers 23 are arranged in pairs, one pair for each pair of rods 8, and there are two shafts 24, one for each pair of rock arms, as will be seen from an inspection of Figure 1. The rods 8 can be adjusted to any desired height by sliding them through openings 22 in an appropriate direction, and when adjusted will be automatically locked by spring-pressed plungers 25 seating in recesses 26.

When the pulling members 15 depending from brackets 5 have been engaged over the split base or side wings of the tire T by adjustment of the rods 8 in their bearings, motor 27 is started and rotation of the spool-shaped rollers 1 and actuation of the rock shafts 24 is effected by means of suitable mechanism, not shown, operatively connecting said motor with said rollers and rock shaft. As the upper ends of the rods 8 move downwardly and outwardly the sides of the tire casing will be progressively engaged by the rollers 14, and at the same time the rollers 19 will engage the upper face or periphery 21.

What we claim is:

1. In a tire spreading machine, means to rotatably support a tire and means to spread said tire, said last mentioned means including pivotally mounted levers, rods mounted within said levers and longitudinally adjustable with respect thereto, brackets hinged to the top end of said rods and axially rotatable with respect thereto, and a cone-shaped hook member angularly related with respect to and connected with said brackets.

2. In a tire spreading machine, means for rotatably supporting a tire, means for spreading said tire including a series of superposed rollers of progressively increasing size arranged to rotate about a substantially vertical axis, a support for said rollers, and a roller on said support arranged to rotate about a substantially horizontal axis.

3. In a tire spreading machine, means for rotatably supporting a tire, means for spreading said tire including an adjustable rod, an arm mounted on said rod for rotatable adjustment with respect thereto, a bracket hinged at one end to said arm, and a plurality of rollers carried by and depending from the other end of said bracket.

4. In a tire spreading machine, means to rotatably support a tire and means to spread said tire including brackets having a series of individual rollers for engagement with the flat top face of the head portion of the tire, and a cone shaped hook member formed of individually rotatable rollers mounted on the shaft at the end of said bracket and increasing in size continuously from the inner to the outer end of said bracket for engaging the inner face of the tire.

In testimony whereof we affix our signatures.

WILLIAM G. PRENTICE.
FRANK B. COPELAND.